UNITED STATES PATENT OFFICE.

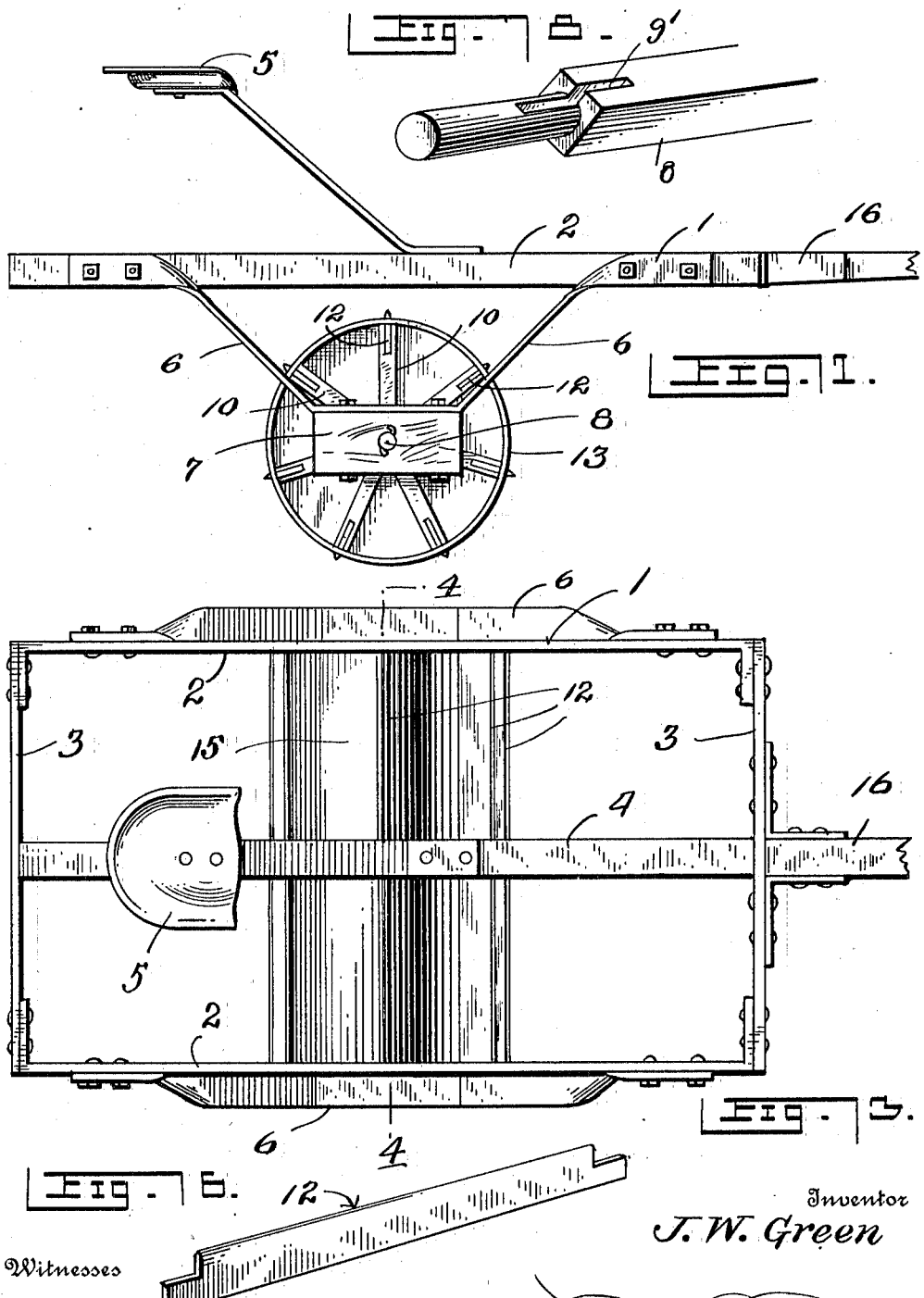

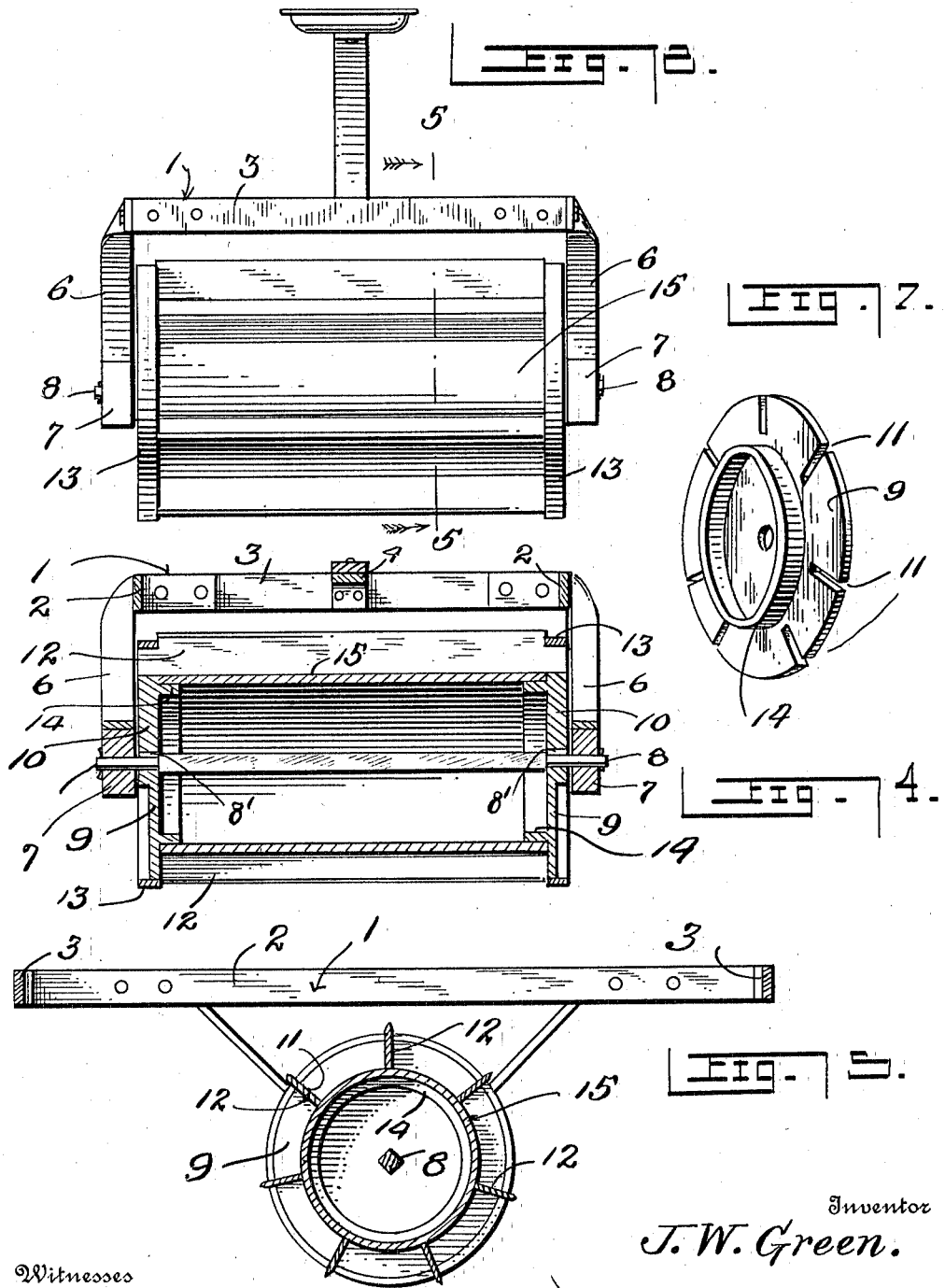

JOHN W. GREEN, OF BROOKLET, GEORGIA.

STALK-CUTTER.

1,059,357.  Specification of Letters Patent.  Patented Apr. 22, 1913.

Application filed August 2, 1912. Serial No. 712,951.

*To all whom it may concern:*

Be it known that I, JOHN W. GREEN, a citizen of the United States, residing at Brooklet, in the county of Bulloch, State of Georgia, have invented certain new and useful Improvements in Stalk-Cutters; and I do hereby declare the following to be a full, clear, and exact description of the invention, such as will enable others skilled in the art to which it appertains to make and use the same.

This invention relates to improvements in cotton stalk cutters.

The invention has for its object to provide a device of this character so constructed that when it is rolled across the field, the cotton stalks will be thoroughly crushed and cut.

A further object of the invention is to provide a new and novel means for securing the cutting knives and bracing the same.

With these and other objects in view, this invention resides in the novel features of construction, formations, combinations and arrangements of parts to be hereinafter more fully described, claimed and illustrated in the accompanying drawing, in which:—

Figure 1 is a side elevation of the device. Fig. 2 is a rear elevation. Fig. 3 is a top plan view. Fig. 4 is a sectional view on line 4—4 of Fig. 3. Fig. 5 is a section view on line 5—5 of Fig. 2. Fig. 6 is a detail perspective view of one of the cutting blades. Fig. 7 is a detail perspective view of one of the heads. Fig. 8 is a fragmentary detail perspective view of one end of the axle.

Referring to the drawing, the numeral 1 designates a frame, which consists of side bars and end bars 2 and 3, respectively, the same being formed from suitable metal. Having its opposite ends connected to the end bars 3 is a bar 4, upon which the driver's seat 5 is supported. Secured to the side bars 2 are brackets 6 to the lower ends of which are bolted wooden bearings 7 in which are journaled the ends of the axle 8.

Keyed to the axle 8 by keys 8' are circular heads 9, the outer surfaces of which are reinforced by radially disposed ribs 10. The keys 8' engage the slots 9 and slots 9' formed adjacent the ends of said axle. The peripheries of the heads 9 are provided with a plurality of slots 11 which extend through the ribs 10 and are adapted to receive the ends of the cutting blades 12, and are held in said slots by bands 13 which encircle the heads. The opposing faces of the heads 9 are provided with annular shoulders 14 which are engaged by the ends of the metallic drum 15, thus supporting the drum in such a manner that the inner edges of the blades 12 will rest upon the drum and effectually brace the same throughout their length.

To one of the end bars 3 is secured a tongue 16, and to which the draft animals are attached for drawing the device across the field, and during which operation the heads 9 and their connected parts will rotate so that the blades will successively engage the cotton stalks, thus crushing the same.

What is claimed is:—

In a device of the class described comprising a frame, brackets depending from the frame, bearings carried by the brackets, an axle having its opposite ends journaled in the bearings, circular heads fixed to the axle, said heads having a plurality of slots formed in their peripheries, cutting blades having their opposite ends secured in said slots, bands encircling the periphery of the heads to hold the ends of the blades in said slots, annular shoulders formed upon the opposing faces of said heads, and a drum having its opposite ends engaging said shoulders, thereby supporting the drum so that the inner edges of the cutting blades rest thereagainst.

In testimony whereof, I affix my signature, in presence of two witnesses.

JOHN W. GREEN.

Witnesses:
E. J. WATKINS,
F. W. HUGHES.

Copies of this patent may be obtained for five cents each, by addressing the "Commissioner of Patents, Washington, D. C."